Nov. 18, 1969 R. D. SCOTT 3,479,661
HYDRODYNAMICALLY SUPPORTED MAGNETIC HEAD
Filed Oct. 20, 1966
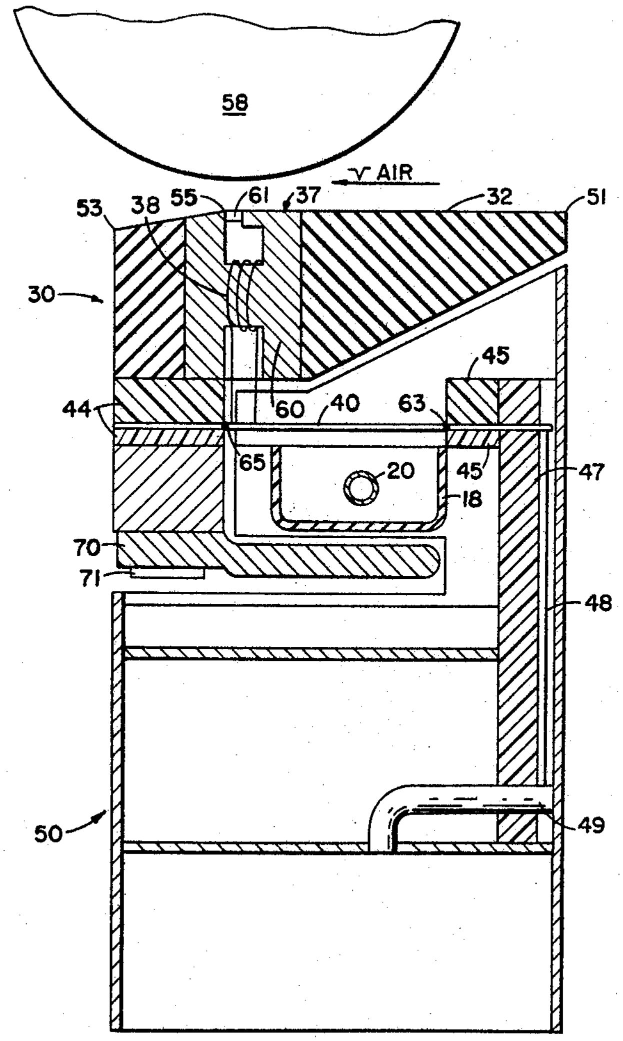
Richard D. Scott,
INVENTOR.
BY Harry M. Saragovitz
Edward J. Kelly
Herbert Berl
Alfred E. Smith United States Patent Office 3,479,661
Patented Nov. 18, 1969

3,479,661
HYDRODYNAMICALLY SUPPORTED MAGNETIC HEAD

Richard D. Scott, Camden, N.J., assignor, by mesne assignments, to the United States of America as represented by the Secretary of the Army Filed Oct. 20, 1966, Ser. No. 588,694
Int. Cl. G11b 5/00
U.S. Cl. 340—174.1 1 Claim

ABSTRACT OF THE DISCLOSURE

A system for achieving high resolution of recorded signals on rigid magnetic recording media by means of a compressed air film between the magnetic head assembly and the magnetic disc recording member. This system includes a compressed air port and rubber bladder device for retracting the magnetic head from the magnetic disc recording member. The system possesses high stability for use in radar computers at video frequencies.

The present invention is an improvement over my invention disclosed in application Ser. No. 39,913, filed June 30, 1960, now U.S. Patent 3,228,014 entitled "Apparatus for Providing Fluid Bearings"; and specifically relates to improvements in a magnetic head assembly, as described below.

A critical factor in magnetic recording and reproducing systems is the separation of the recording surface and the magnetic head. The amplitude of the signals recorded or reproduced, the resolution of recorded signals, and the noise introduced by the system all depend upon the separation of the magnetic head and the recording surface. In order to avoid wear and deterioration, the head and surface should not touch, but should be as close together as possible, to provide good resolution.

It is inherent for the magnetic head and recording surface to vary in spacing. This is due to machine tolerances and other mechanical factors, such as inherent bearing run-out. The ability of a system to maintain constant separation is referred to as the stability of the system. Variation in the spacing between the recording surface and the magnetic head due to instability effectively modulates the signal recorded or reproduced by the magnetic head. This modulation introduces an unwanted noise component into the signal which should be kept to a minimum for proper system operation.

In the above identified patent application, the stability of the system, after both coarse and fine adjustment of the magnetic head, depends greatly on the speed of the magnetic disc or drum. With an increase in speed, more air will flow between the magnetic head and the magnetic disc surface. This causes an increase in air pressure on the surface of the magnetic head facing the magnetic disc surface and will tend to separate them. The load on the cantilevered springs will be increased accordingly, and the magnetic head floating pad will be forced away from the magnetic recording surface.

Accordingly, it is an object of the present invention to provide greater floating stability than previous devices.

It is another object of the present invention to provide greater dimensional tolerances in mounting the device.

It is a further object of the present invention to eliminate the need for leveling screws.

It is a still further object of the present invention to eliminate the need for spring adjusting screws.

It is a still further object of the present invention to provide a device which requires no critical adjustment during installation in a system.

It is a further object to provide a means for retracting the floating pad section of the device from the magnetic recording surface without retracting or moving the base.

It is, also, an object of the present invention to eliminate the need of wire loops and terminal pins since a plurality of springs on the improved device act as electrical conductors.

The above and still further features, objects and advantages of the present invention will become apparent upon consideration of the following detailed description of a specific embodiment of the invention, when read in connection with the accompanying drawing in which:

The single figure is a cross-sectional view of a magnetic head recording and reproducing system provided with a hydrodynamically floating pad and base mounting assembly in accordance with the present invention.

Referring now to the figure, reference numeral 50 denotes the stationary base member and reference numeral 30 denotes the floating pad portion of the magnetic head assembly. Floating pad 30 is mounted on base 50 by means of a plurality of coplaner cantilevered springs 40, only one of which is shown in the figure. When the magnetic head is in use, face 32 of floating pad 30 is mounted adjacent recording surface 58. Floating pad 30 may be moved away from recording surface 58, in a rotational and/or translational manner, by means of rubber bladder 18 being expanded by a gas medium injected in port 20. Rubber bladder 18, when expanded a sufficient amount, will place pressure on retraction arm 70, which is rigidly attached to floating pad 30 by means of fastening device 71.

At all times, cantilevered springs 40 will bias face 32 of floating pad 30 toward the recording medium in a rotational manner about point 63. Point 63 is located where cantilevered springs 40 intersect with insulation material 45 of base 50. As the speed of the recording surface adjacent face 32 is increased, a wedge shaped air film is provided by the movement of the air, designated and shown directionally by the legend $V_{air}$, and creates a load on face 32 that tends to move floating pad 30 away from the recording surface in a rotational manner about point 63. Another rotational force is present on floating pad 30 about point 65 in the opposite direction. Point 65 is located where cantilevered springs 40 and insulation 44, of floating pad 30, intersect. Number 51 designates the leading edge, and number 53 the trailing edge of floating pad 30. Magnetic head 37 is located inside floating pad 30, and contains signal gap 61, and coil 38 wound around magnetic core 60. Numeral 55 designates the trailing edge of signal gap 61. Cantilevered springs 40 are of a length such that the spring force supplied to floating pad 30, to counteract the increased film force, causes an additional deflection of the pad which tends to restore the original spacing of the trailing edge 55, in accordance with the dynamic force characteristics of the air film.

Coil 38, wound around magnetic core 60, has opposite ends connected to alternate electrically conductive cantilevered springs 40. Cantilevered springs 40, surrounded by insulator material 44 in the floating pad portion and insulator material 45 in the base portion, are electrically connected to printed circuit board 47 and by conductors 48 to a plurality of terminal pins 49, only one of which is visible in the drawing. The magnetic head may be connected to electronic apparatus associated therewith by way of terminal pins 49.

I claim:

1. A hydrodynamically supported magnetic head assembly for use adjacent a movable recording medium comprising: a floating pad formed of insulation material, said floating pad comprising a magnetic head on one side and having a rigidly attached retraction arm on another side, said magnetic head comprising a gapped magnetic core having a coil wound therearound, said gapped magnetic core extending outward to an outer surface of said floating pad, said outer surface and said gap being adjacent said recording medium; a stationary base member formed of insulation material and comprising a printed circuit board having an input and an output and first and second output terminal pins, said floating pad attached to said base member by means of a plurality of electrically conductive cantilevered springs, with one end of said cantilevered springs being attached to said floating pad between said magnetic head and said retraction arm and another end of said cantilevered springs being attached to said base members, one end of said coil being connected to the one end of a first of said cantilevered springs and the other end of said coil being connected to the one end of a second of said cantilevered springs, with another end of the first of said cantilevered springs being connected to the input of said printed circuit board and another end of the second of said cantilevered springs being connected directly to the second of said output terminal pins, said output of said printed circuit board being connected to the first of said output terminal pins; and an inflatable bladder retracting means mounted within said base member and between said cantilevered springs and retraction arm of said floating pad, said inflatable bladder having an air port for receiving air therein and for inflating said inflatable bladder, said inflatable bladder positioned to contact, when inflated, said retraction arm whereby said floating pad is movable away from said recording medium in accordance with the amount of air injected into said bladder.

References Cited

UNITED STATES PATENTS

| | | | |
|---|---|---|---|
| 3,187,315 | 6/1965 | Cheney ___________ | 340—174.1 |
| 3,229,268 | 1/1966 | Solyst ___________ | 340—174.1 |
| 3,323,116 | 5/1967 | Solyst ___________ | 340—174.1 |

BERNARD KONICK, Primary Examiner

U.S. Cl. X.R.

179—100.2